US008414223B2

(12) United States Patent
French, Sr.

(10) Patent No.: US 8,414,223 B2
(45) Date of Patent: Apr. 9, 2013

(54) INTELLIGENT HYDROELECTRIC DAM WITH POWER STORAGE

(75) Inventor: William L. French, Sr., Lexington, MA (US)

(73) Assignee: French Development Enterprises, LLC, North Billerica, MA (US)

( * ) Notice: Subject to any disclaimer, the term of this patent is extended or adjusted under 35 U.S.C. 154(b) by 0 days.

(21) Appl. No.: 13/225,990

(22) Filed: Sep. 6, 2011

(65) Prior Publication Data
US 2012/0087733 A1 Apr. 12, 2012

Related U.S. Application Data

(63) Continuation of application No. 13/092,855, filed on Apr. 22, 2011, now abandoned.

(60) Provisional application No. 61/477,360, filed on Apr. 20, 2011, provisional application No. 61/327,500, filed on Apr. 23, 2010.

(51) Int. Cl.
*E02B 7/02* (2006.01)
*E02B 9/02* (2006.01)
*E02B 8/06* (2006.01)

(52) U.S. Cl.
USPC ............. 405/116; 405/114; 405/108; 405/78

(58) Field of Classification Search ............ 405/78, 405/81, 107, 108, 110, 112, 114, 116
See application file for complete search history.

(56) References Cited

U.S. PATENT DOCUMENTS

| 1,898,095 | A | * | 2/1933 | Noetzli ........................ 405/112 |
| 2,138,070 | A | * | 11/1938 | Parkinson et al. ........... 405/114 |
| 2,138,071 | A | * | 11/1938 | Parkinson et al. ........... 405/112 |
| 2,515,059 | A | * | 7/1950 | Rowbotham .................. 405/110 |
| 2,566,748 | A | * | 9/1951 | Ringrose ...................... 405/114 |

(Continued)

FOREIGN PATENT DOCUMENTS
EP 399870 A1 * 11/1990
JP 2005-090208 4/2005
(Continued)

OTHER PUBLICATIONS
PCT/US2011/033643 Written Opinion dated Oct. 27, 2011.
(Continued)

*Primary Examiner* — Frederick L Lagman
(74) *Attorney, Agent, or Firm* — Hamilton, Brook, Smith & Reynolds, P.C.

(57) ABSTRACT

Dams are a useful source of energy. An embodiment of a dam according to the present invention includes precast segments configured to be coupled together to form a dam optionally used to generate energy. An embodiment includes a spillway extender to prevent upstream or downstream erosion of a riverbed at the dam. An underpinning system may be employed to assist in maintaining position of the dam or segmental components. Solar panel energy generation systems and battery storage may be associated with the segmental dam to store energy and, optionally, produce auxiliary power for subsystems associated with the dam, such as for supporting automated spillway control gate level control or automated gearing system control to control a gear ratio associated with rotating or other moving parts used to convert kinetic energy of water into electrical energy.

30 Claims, 9 Drawing Sheets

U.S. PATENT DOCUMENTS

| | | | | |
|---|---|---|---|---|
| 2,961,731 A | * | 11/1960 | Buzzell et al. | 405/114 |
| 3,342,033 A | * | 9/1967 | Crouch et al. | 405/116 |
| 4,493,587 A | * | 1/1985 | Ferrari | 405/114 |
| 5,439,316 A | * | 8/1995 | Richardson | 405/114 |
| 6,042,301 A | * | 3/2000 | Sovran | 405/112 |
| 6,281,597 B1 | * | 8/2001 | Obermeyer et al. | 405/78 |
| 7,422,392 B2 | * | 9/2008 | Obermeyer | 405/107 |
| 7,478,974 B1 | * | 1/2009 | Kelly | 405/78 |
| 2002/0018696 A1 | * | 2/2002 | Robinson | 405/107 |
| 2006/0078388 A1 | * | 4/2006 | Obermeyer | 405/87 |
| 2008/0240861 A1 | * | 10/2008 | Phillips | 405/114 |

FOREIGN PATENT DOCUMENTS

| | | |
|---|---|---|
| KR | 10-2006-0025314 | 3/2006 |
| KR | 10-2008-0077937 | 8/2008 |
| KR | 10-2009-0047190 | 5/2009 |

OTHER PUBLICATIONS

PCT/US2011/033643 International Search Report dated Oct. 27, 2011.

* cited by examiner

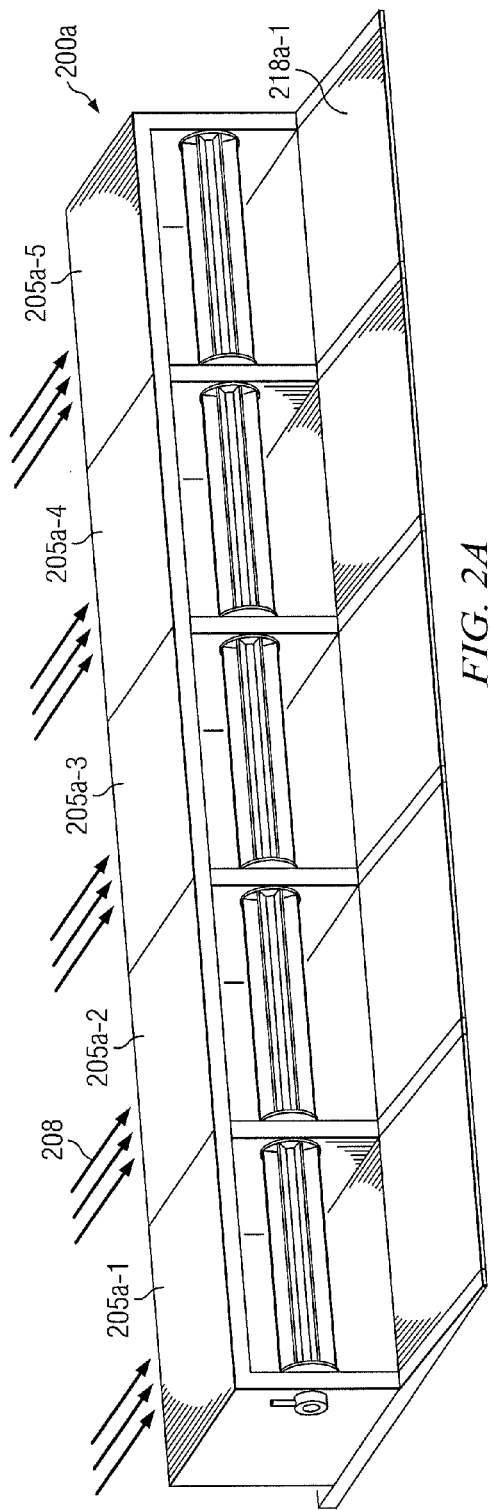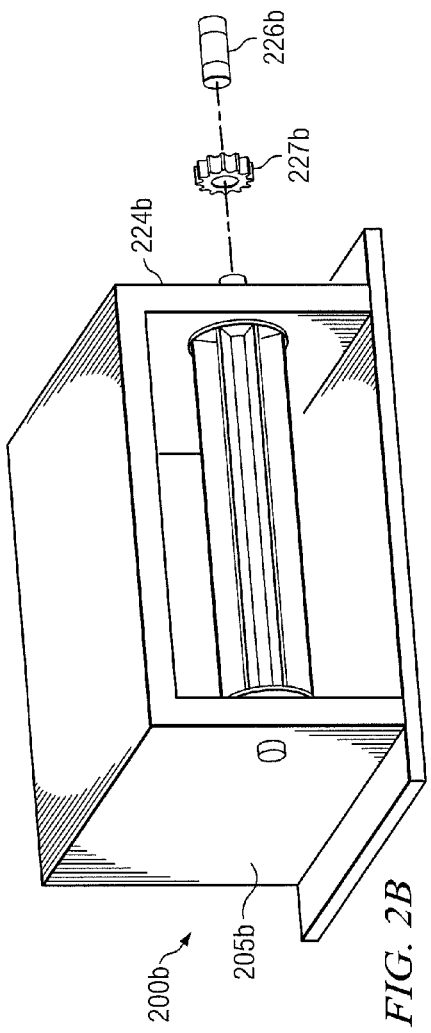
FIG. 2A
FIG. 2B

INTELLIGENT HYDROELECTRIC DAM WITH POWER STORAGE

RELATED APPLICATIONS

This application is a Continuation of application Ser. No. 13/092,855, filed on Apr. 22, 2011, now abandoned, which claims the benefit of U.S. Provisional Application No. 61/477,360, filed on Apr. 20, 2011, entitled "Intelligent Hydroelectric Dam with Power Storage" by William L. French, Sr. and claims the benefit of U.S. Provisional Application No. 61/327,500, filed on Apr. 23, 2010, entitled "Intelligent Hydroelectric Dam with Power Storage" by William L. French, Sr. The entire teachings of the above applications are incorporated herein by reference.

BACKGROUND OF THE INVENTION

Hydroelectric dams provide electrical power through use of converting kinetic energy provided by running water into electrical power through use of rotation-to-electric converters, as well known in the art. An example of such a dam is the Hoover Dam that provides great amounts of electrical power for providing electricity to a grid that is configured to distribute electrical energy to a local area. As well understood in the art, to install a dam requires discontinuity of the flow of water over the portion of land at which the dam is to be placed such that pouring of concrete and curing of the concrete may be done, with installation of power generation components to be completed prior to redirecting the water flow back to the dam.

SUMMARY OF THE INVENTION

An example embodiment of the present invention includes precast segments configured to be interconnected to other precast segments to compose a dam, and may also include a main energy generation component, which may be operably interconnected to the interconnected precast segments. The main energy generation component is configured to be coupled to an energy transfer bus. At least one interlocking element is configured to interconnect the precast segments.

Another example embodiment of the present invention includes a method for interconnecting precast segments, where the precast segments may be operably interconnected to an energy generation component, which is coupled to an energy transfer bus, and interconnected to each other via at least one interlocking element.

BRIEF DESCRIPTION OF THE DRAWINGS

The foregoing will be apparent from the following more particular description of example embodiments of the invention and as illustrated in the accompanying figures. The drawings are not necessarily to scale, emphasis instead being placed upon illustrating example embodiments of the present invention.

The accompanying figures where like reference numerals refer to identical or functionally similar elements throughout the separate views and which together with the detailed description below are incorporated in and form part of the Specification, serve to illustrate various embodiments further and to explain various principles and advantages all in accordance with the example embodiments of the present invention. The teachings of all patents, published applications and references cited herein are incorporated by reference in their entireties.

FIG. 2A is a mechanical diagram of multiple segmental precast dam components arranged together to form a composite dam.

FIG. 2B is a view of a single precast dam having a hydroelectric energy generation system and a gearing system to change a rate of rotation of the electrical generator for a given rate of waterflow.

DETAILED DESCRIPTION OF THE INVENTION

Figure 1A:
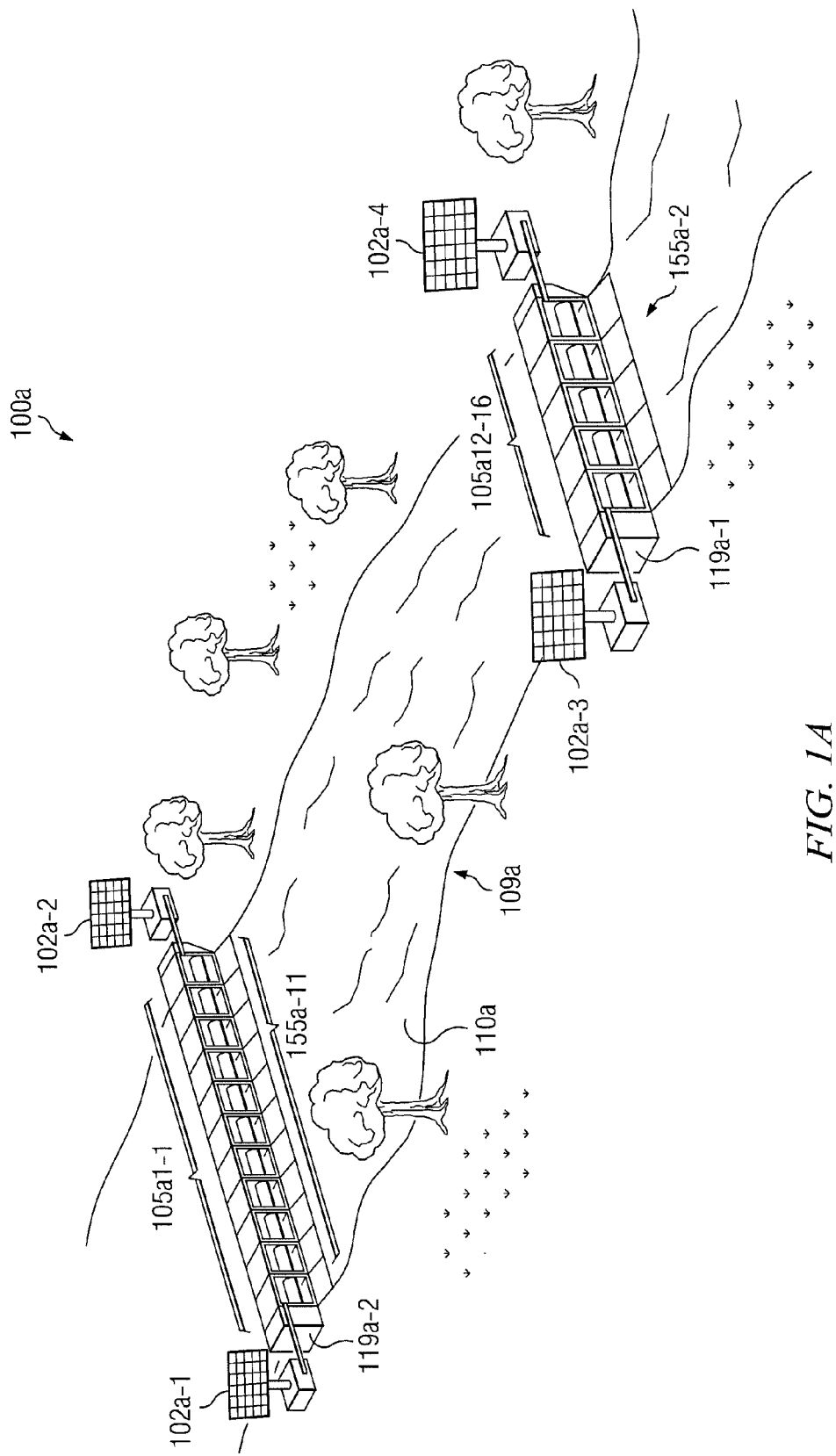
FIG. 1A is a high level view of a river in which multiple dams according to embodiments of the present invention may be employed, optionally including auxiliary power systems, such as solar panel auxiliary power systems.

A description of example embodiments of the invention follows.

An embodiment of the present invention includes precast dam components that may be installed at a dam location, either with water flow diverted or while water flow continues, depending on the strength of the water flow.

An embodiment of the invention may include an underpinning system that has elements of concrete or other materials formed in the shape of large pins that are positioned vertically into the ground at which the dam is to be located and having a diameter configured to match a diameter of a hole defined by a lower surface of the dam component, such as a precast dam component, to be installed at the location of the underpinning elements.

A spillway extender may be provided to prevent downstream erosion, where the spillway extender is configured to be integrally coupled to the precast dam components such that waterflow immediately downstream of the precast dam components do not cause the surface of riverbed to erode away, which may result in an instability of the dam components.

An adjustable pressure gate may be included or integrated into precast dam components such that water flow rate and pressure may be raised or lowered in any manner desired, such as to maintain a constant pressure across a turbine in the precast dam components during periods having a lower or expectedly lower rainfall or other precipitation such that the river or reservoir has a lower water height than usual. The gate may be mechanically, manually, or electrically adjustable.

The dam may further include an intelligent gear shifting apparatus that is used to change gears of the turbine or other rotational components such that the rotational forces may be increased or decreased in a manner most effective to translating the rate of waterflow across the rotational element to produce higher or lower conversion of rotation to electricity. A control system having intelligence may be employed to shift the gears in an adaptive manner.

In addition to the main energy generation turbines or other rotational elements used to generate energy, auxiliary energy generation sources may be employed to provide energy for electrical components at the dam, where such auxiliary energy generation systems may include upstream or downstream mini-turbines or even solar panels configured at either side of a river at the dam.

In the case of precast dam components, the precast dam components may be configured as square or rectangular or other geometrical shaped structures that have interlocking features to enable multiple precast dam components to be interlocked together to form a unified dam. The interlocking features may include, for example, any male/female features known in the art, such that construction of the dam of the multiple components may be done quickly and efficiently at the site. Dividers upstream or downstream of the interlocking dam features and, in one embodiment, above spillway extenders associated with the dam or segmental components, may be provided to form multiple segmental spillways, which may add to longevity of the dam. Keyways may be employed to provide an interlocking feature for a male feature of the dividers such that good alignment with vertical walls of the segmental dam components may be provided and maintained. The dividers having an angle opening in a downstream direction may also or alternatively be provided on the upstream side of the dam to prevent debris or other objects from damaging or dislodging any of the segments of the dam or energy generation components therein.

FIG. 1A is a high level diagram 100a of a river 110a in which multiple dams according to embodiments of the present invention may be employed, optionally including auxiliary power systems, such as solar panels 102a-1 . . . 4 auxiliary power systems. Alternative example embodiments may include additional or different auxiliary power systems, such as wind turbines or mechanically powered systems. FIG. 1A further illustrates a river at which two dams 155a-1,2 with power generation devices, such as turbines or water wheels (not shown), may be employed. In the diagram 100a, the dams 155a-1,2 have associated therewith other power generators, referred to herein as auxiliary generators, which may be in the form of solar panels 102a-1 . . . 4 or auxiliary water wheels (not shown).

During assembly of the dams, the precast segments 105a-1 . . . 16 may be deployed while the river 110a, or other body of water, is flowing or while the river is diverted in some other path, depending upon the flow rate of the river, as should be understood in the art. The river bed 109a may be fitted with an underpinning system (not shown), such as vertically arranged cement rods or metallic rods that extend a certain depth into the riverbed, such as 6 feet or 20 feet, depending on the expected strength of the river, such that they may support the precast dam structure(s) to maintain the dams' segmental and collective positions in the riverbed. The precast structures 105a-1 . . . 11 and 105a-12-16 may individually (i.e., 105a-1, -2, . . . , -16) define interlocking male or female components (not shown) such that they may be integrally configured with the underpinning elements (not shown).

The dams 155a-1,2 themselves may have single or multiple energy storage elements 119a-1,2, such as batteries, that may accept electrical power or energy generated by the power generating elements associated with the dams 155a-1,2, from which energy may later be drawn for use in various applications, such as those involved with generating power at the dam or used to provide electricity for residences (not shown), municipals, or power grids. Inverters (not shown) may be employed to convert DC power of the energy storage elements 119a-1,2 to AC power, or AC power may be provided directly by the turbines of the dams.

Because a dam may be formed of multiple precast dam components, construction and assembly of the dams is significantly reduced such that multiple dams along a river, optionally in very close proximity, may be provided at significantly lower cost than were a single, large, dam structure and associated power generation and storage equipment constructed on the same waterway. Such reduction in costs may lend itself to a distributed energy power generation/storage/delivery system that may be more convenient, economical, and otherwise useful to a local or widespread region.

Figure 1B:
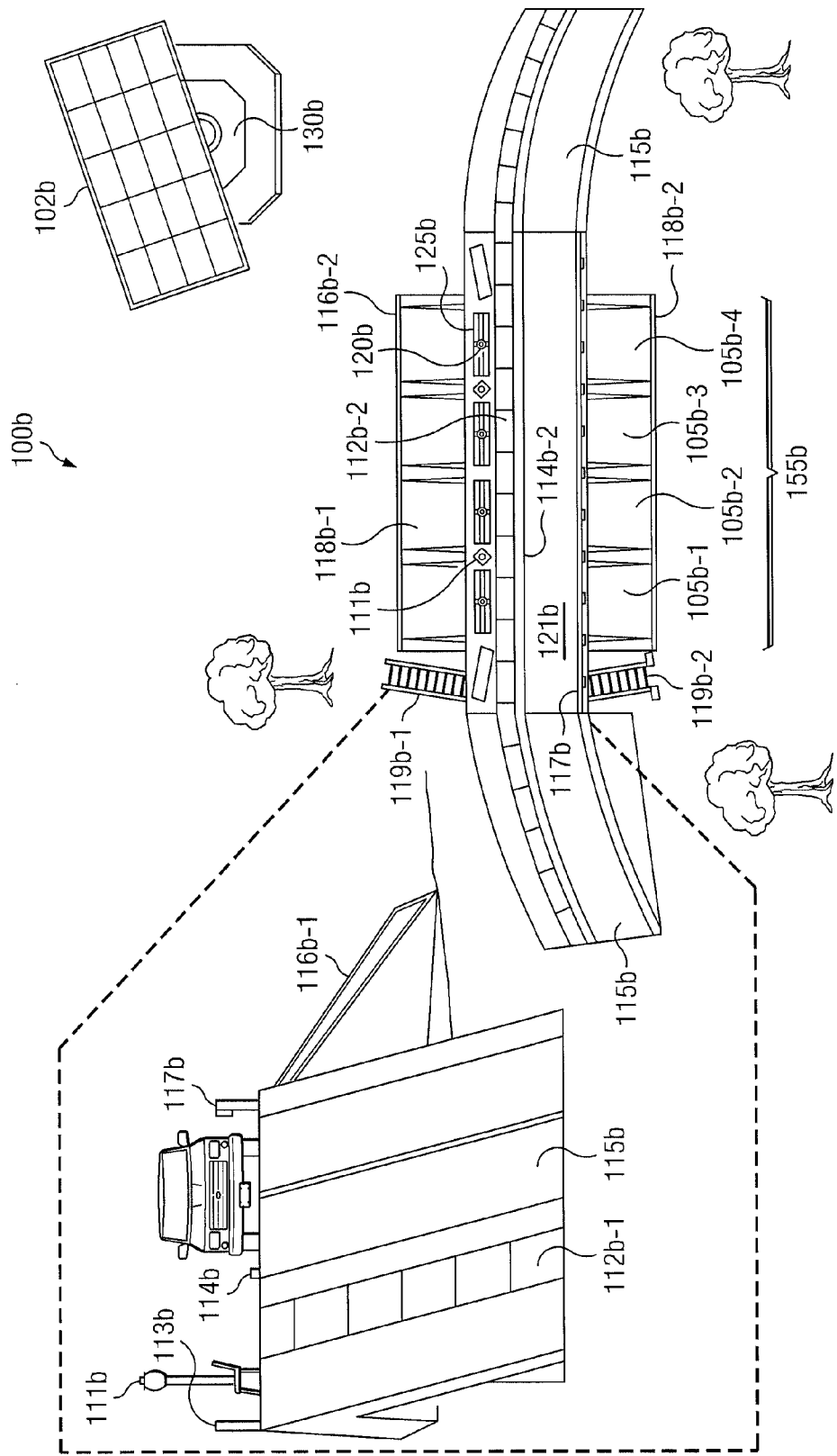
FIG. 1B is a high level view of a dam according to an example embodiment of the present invention optionally including segmented ballast base support structures.

FIG. 1B is a high level diagram 100b of an example embodiment of the present invention that illustrates an upstream water control system interconnected to a precast segmented access path for traversing and interacting with the dam system. The diagram 100b illustrates an assembled dam 155b of an embodiment of the present invention including interconnected precast dam structures 105b-1 . . . 4. The precast structures 105b-1 . . . 4 may further include buttress walls 116b-1-2, which may be configured to include suction capabilities and may be connected to or located near spillways 118b-1,2. The spillways 118b-1,2 may be segmental precast constructs, which may be assembled during or after the assembly of the dam or dam segments. The dam 155b may further include or be interconnected with precast sections of additional segmental structures, such as walkways or roadways, which may be linked using a bolt linkage system, keyway method, or other known interlocking method.

The dam 155b may further include an energy source, such as solar panel 102b, which may include a land or ground mounted dual axis solar tracking system. Details of a dual axis solar tracker are described further in Applicant's pending U.S. patent application (Serial Number not yet assigned) being filed concurrently herewith, entitled "Dual Tower Solar Tracker System" by William L. French, Sr., which claims priority to U.S. Provisional Application No. 61/477,354 filed on Apr. 20, 2011, and is related to and incorporated by reference U.S. Provisional Application No. 61/327,500 filed on Apr. 23, 2010 entitled "Dual Tower Solar Tracker System" by William L. French, Sr.; the entire teachings of the above applications being incorporated herein by reference in their entireties. Continuing to refer to the example embodiment of FIG. 1B, the dam 155b may further include or be interconnected with a water gate control unit 120b and/or an adjustable water gate 125b, which may be operated individually or simultaneously.

The example embodiment of the dam 155b of FIG. 1B may include a segmented ballast base support system that may be configured on, around, or over unstable ground in a manner providing for a precast access ramp 115b that may be implemented to connect opposite embankments of the waterway through which the dam is located. The segmented precast support system may further allow for a fish ladder (or fishway) 119b to pass through or down the structure surrounding the dam system so as to enable fish to pass around the barrier to the waters on the other side of the dam. The precast access ramps may interconnect an access road 121b that may be constructed on location using precast segmental system. Details of the segmented ballast base support structure are described further in pending U.S. patent application Ser. No. 12/658,608 filed on Feb. 9, 2010, entitled "Segmented Ballast Base Support Structure and Rail and Trolley Structures for Unstable Ground" by William L. French, Sr. The entire teachings of which are incorporated herein by reference.

The precast segmented support structure system and method may be used to incorporate a precast guard rail 117b, precast spillway with buttress wall 116b, precast curb 114b, splash wall 113b, or public or private walkway 112b, and any or all of which may be surrounded by or laid on top of an uneven or unstable ground structure, such as grass, mud, slanted ground, etc.

FIG. 2A is a mechanical diagram 200a of multiple segmental precast dam components arranged together to form a composite of the segmental dam 205a-1 ... 4. FIG. 2A illustrates the waterflow 208a to a dam formed of the precast segments 205a-1 ... 4. The precast segments 205a-1 ... 4 may be interlocked in any way understood in the art, such as through composite component structures precast into the cement, affixed into the precast cement, or otherwise understood in the art, including elements coupled to the precast structures after the precast structures have been formed. A mechanical knob, lever, or other device (not shown) may be provided with the collective or component structure(s) to raise and lower turbines or other rotational elements in the dam to accommodate the height of water flowing therethrough. Further, mechanical elements may be provided to raise and lower gates associated with the collective dam or components thereof such that the height of water flowing into or out of the dam may be controlled mechanically. It should be understood that automated electrical raising and lowering of the rotational elements or gates may also be employed, where sensors and activation elements, such as linear or rotational motors and motion support assemblies, may also be employed. It should be understood that any electronics or mechanical elements may be sufficiently protected against the elements, particularly in the environment of water and water-related elements.

FIG. 2B is a diagram 200b of a single precast dam (e.g., dam component) 205b having a hydroelectric energy generation system and a gearing system 227b to change a rate of rotation of the electrical generator for a given rate of waterflow. The mechanical diagram 200b is a single segment for hydroelectric energy generation system that may be used in a multiple segmental group to define a dam on a waterway of arbitrary width. The diagram of FIG. 2B further includes an indicator of a gear system 227b that may be used to change the rate of rotation of any rotational elements used in the power generation portion of the dam. The diagram also includes an indication of a shaft or shaft system 226b to transfer mechanical energy to electrical energy (transformer not shown) such that electrical energy is produced and transferred via electrical cables (not shown) or other conductive components to a battery storage or otherwise to a power distribution system to reach an end user.

Figure 2C:
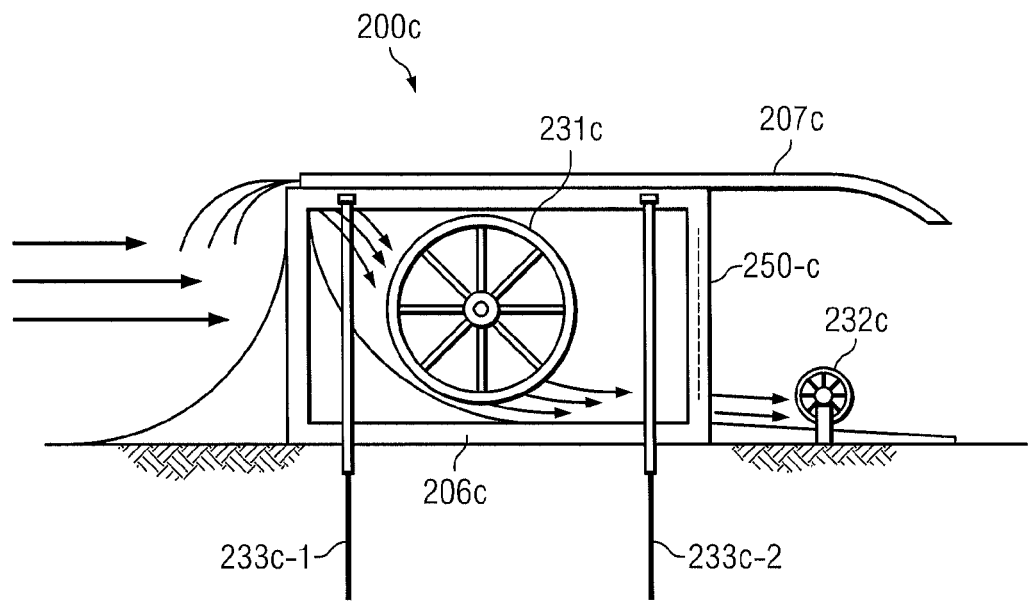
FIG. 2C is a side view of a dam according to an embodiment of the present invention in which a rotary wheel used for converting waterflow to electrical energy is employed, where the waterflow travels beneath the wheel to cause a rotation and optionally causes an auxiliary wheel to rotate to generate auxiliary power.

FIG. 2C is a side view 200c of a dam according to an embodiment of the present invention in which a rotary wheel (e.g., a turbine) 231c used for converting waterflow to electrical energy is employed, where the waterflow travels beneath the wheel 231c to cause a rotation, and, optionally, causes auxiliary wheels, such as auxiliary wheel 232c, to rotate to generate auxiliary power. The example embodiment of FIG. 2C further illustrates water flowing from left to right over a vertical component of an upstream side of the segmental dam and beneath (or over) a water wheel or turbine or other rotational element in a manner causing rotation of the rotational element, which, in turn, causes a movement of an electromagnetic component with respect to another electromagnetic component in a manner known to generate electricity. The example embodiment of FIG. 2C further illustrates an auxiliary wheel 232c to generate electricity for use in providing power for electrical components used at the dam, itself. FIG. 2C further includes vertical elements 233c-1,2 that extend from beneath the riverbed through a floor 206c of a dam component to a ceiling 207c of a dam component such that the vertical elements 233c-1,2 provide structural stability and reinforcement against the dam's moving along the riverbed while water is at a high rate of flow.

Example embodiments of the vertical elements 233c-1,2 may further provide structural stability from ground movement, water pressure, wind flow, and other external or internal factors that can affect the structural integrity or stability of the dam components. The vertical elements, for example, pins, may be any diameter, length or shape, configured to be interconnected with the precast dam component 205c. Further, as shown, the precast dam component 205c may include other precast dam elements that form upstream or downstream features associated with the dam components such that upstream or downstream erosion of the riverbed does not occur or is otherwise minimized. For example, a spillway extender, such as the spillway system 218a-1 illustrated in FIG. 2A, being downstream or upstream of the dam component may extend many feet, such as 10 feet or more, in certain river situations.

Figure 2D:
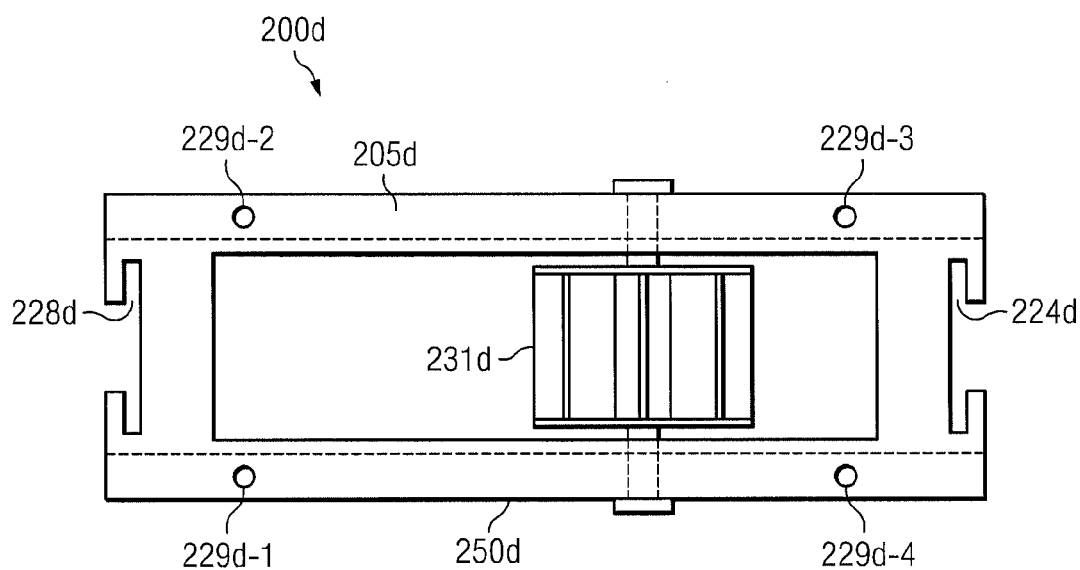
FIG. 2D is a top view of a single precast segment of a hydroelectric dam system that illustrates features fore and aft of the dam to interlock the precast segment with other precast segments or spillway extenders.

FIG. 2D is a diagram 200d of a top view of a single precast segment 205d of a hydroelectric dam system that illustrates features fore and aft of the dam to interlock the precast segment with other precast segments, spillway extenders, or other interlocking components. FIG. 2D further illustrates an example configuration of a water wheel or turbine 231d within the precast structure and illustrates other structural features of the precast structure. For example, the precast structure may define holes 229d-1 ... 4 through which pins extending into the riverbed and up through the bottom (e.g., floor) and, optionally, the top (e.g., ceiling) of the precast structure may be provided. The holes 229d-1 ... 4 may be oversized and filled-in with cement or other filler (not shown) such that ease of integration and deployment may be experienced at the site of installation. In alternative example embodiments, the holes 229d-1 ... 4 may be integrated into the precast structure 205d or may be later installed or carved out as needed during onsite or offsite installation or interconnection. The fore and aft of the precast structure 205d may include slots 228d and 224d such that upstream and downstream components, such as spillway extenders (not shown), may be structurally or mechanically coupled to the precast segment 205d in a simple, convenient, and structurally sound manner. Although not illustrated, slots to interconnect the precast segment with other precast segments may be provided on the sides, top, or bottom of the precast structure, where the slots may run parallel to or perpendicular with the river flow.

Figure 3:
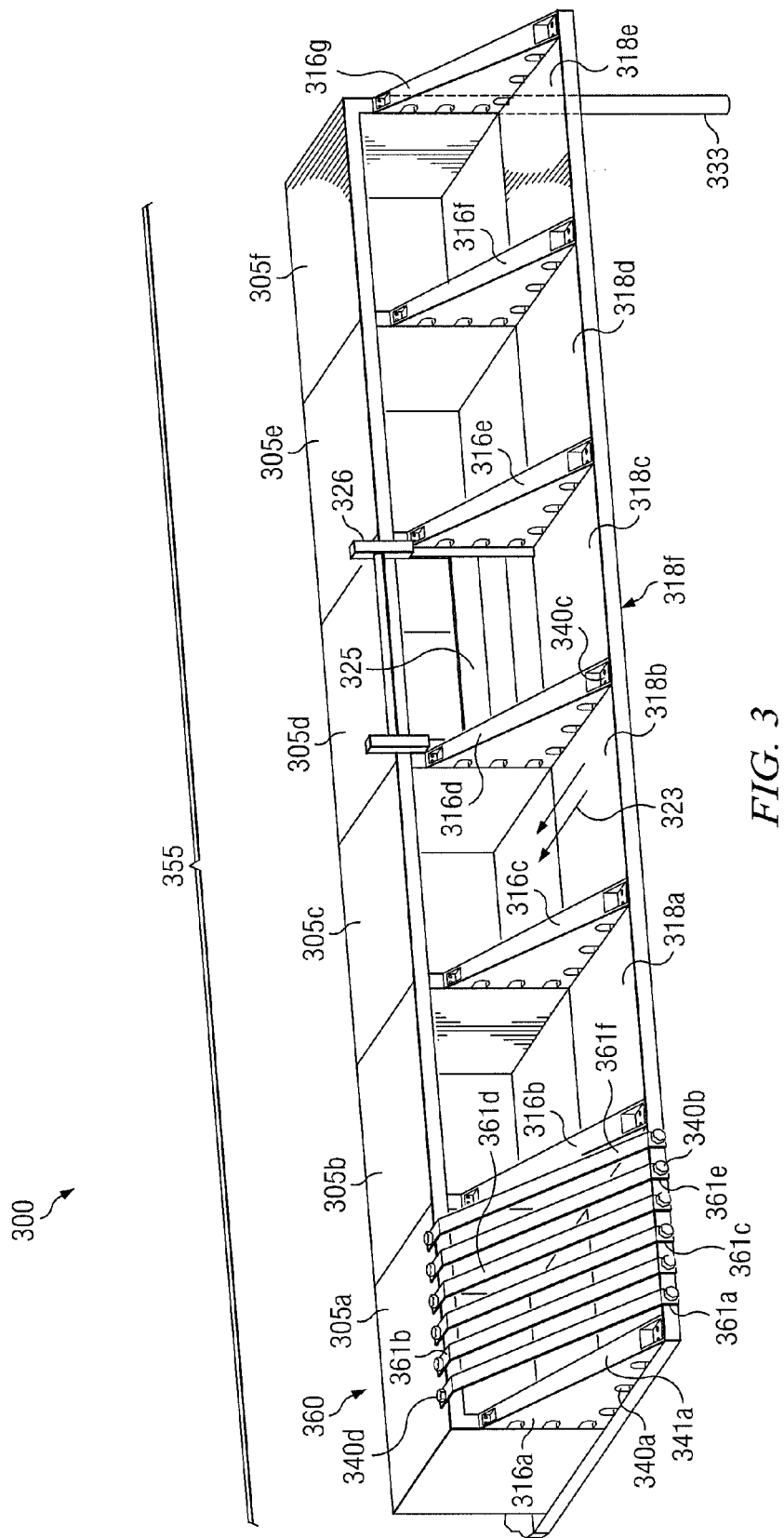
FIG. 3 is a mechanical diagram illustrating upstream and downstream spillway structures that may be precast and assembled along with the precast segmental dam structures.

The slots 228d and 224d and corresponding mating-shaped pintles (now shown) on other segments may be interchangeably referred to herein as "interlocking elements." Alternatively, separate mechanical elements (not shown) may be provided as interlocking elements, where the precast segments may have the same slots 228d and 224d and an interlocking element slide into neighboring slots simultaneously to form a solid mating of adjacent precast segments FIG. 3 is a mechanical diagram 300 illustrating upstream and downstream spillway structures that may be precast and assembled along with the precast segmental dam structures. The mechanical diagram 300 illustrates multiple precast segments 305a-f inter-connected with each other to form a dam 355 in the collective. The dam 355, as illustrated, includes no gaps between each of the precast segments 305a-f so as to force all water (not shown) through the water flow pathways, such as waterflow pathway 323 of the precast segment 305b, defined by each of the precast segments, thereby ensuring all water contributes to the rotation of the power generators (not shown) within each of the segments. It should be understood that the power generators may be positioned in the precast segmental structures in a manner using all or just a portion of the water flowing through the precast segments and that certain ones of the precast segments may, alternatively, not be equipped with power generating components.

Continuing to refer to FIG. 3, the example embodiment also shows tapering (or increasing, depending on one's perspective) dividers 361a-f between segments that are configured above the spillways 318a-e and aligned with vertical walls, such as the vertical buttress or brace walls 316a-g of the segmental dam components. The example embodiments of dividers 361a-f may be precast as part of a debris protection system 360 and installed as may be warranted via linkages, such as a bolt system 340a-d, for example, where the dividers may be galvanized H beam dividers. The dividers 361a-f are typically positioned on the upstream side of the dam such that any downstream-flowing debris or structures, such as boats or swimmers, ride up above the dam to prevent damage to the dam, segmented components of the dam, power generation devices therein, or other elements interconnected to the dam. Thus, flowing water that forces debris, such as large branches, will push the debris upward on top of or over the dam rather than into vertical buttresses of the dam or power generation devices in the dam. This makes for a longer life dam structure than were the dividers not provided.

Alternative example embodiments of the dividers 361a-f may provide for dividers consisting of a variety of materials, shapes, lengths, and other attributes as may be favorable based on the dam location. In alternative example embodiments of the present invention, the dividers may be separately installed into slots, pathways, or other such areas of the precast segments in such a manner as to include a malleable element, such as a spring or shock absorbing component, such that the dam or dam components receive less of an impact of flowing or moving debris, thereby allowing for a more structurally sound dam. It should be understood that the dividers may be placed in some or all of the precast segments at varying or similar configurations, angles, widths, etc.

Alternative example embodiments of example embodiment of FIG. 3 may include a shaft control system 326 to provide for the operation of a water gate 325 as a mechanism for allowing or prohibiting the free flow of a liquid (e.g., water) through the precast segments via the waterflow path way (e.g., waterflow pathway 323) in a manner that enables controlled operation. The shaft control system 326 may be operated manually, automatically, or in any such manner preferable on a per-site or dam location basis.

Figure 4:
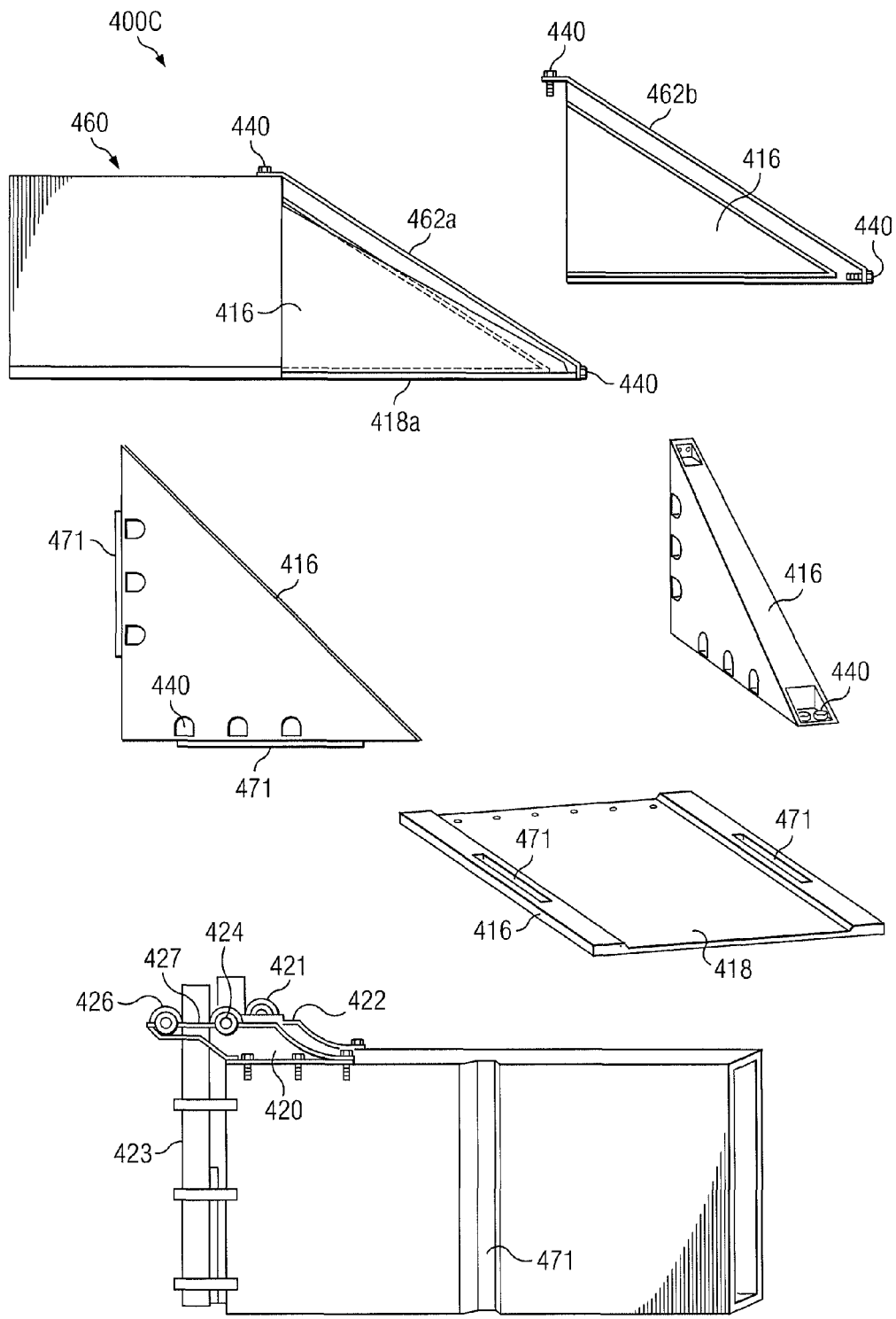
FIG. 4 is a group of mechanical diagrams illustrating spillway structural elements, including vertical and horizontal elements, which may include keyway lock and support structures.

FIG. 4 is a group of mechanical diagrams 400 of spillway structural elements, including vertical and horizontal elements, which include keyway lock and support structures. The mechanical diagrams 400 further illustrate embodiments of features in the spillways and vertical components of the segments of the dam to enable the dividers, such as dividers 361a-f of FIG. 3, to interlock with the dam in a manner maintaining as much integrity as possible and in a manner that allows for ease of assembly at the site of the dam. The dam may be configured and/or assembled to include a section including a debris shield system 460 that includes dividers, such as H beams, 462a-b. The components and/or elements of the dam may be interconnected using linkage bolts 440 and/or other linkage element(s) to form a linkage system. The linkage system may be configured to interlock multiple components using the same or different dimensions and positions of the interconnection systems.

Alternative example embodiments of the diagrams 400 may include additional locking mechanisms, such as the keyway lock and support system 471, for providing structural integrity and reinforcement to the sides, bottoms, and tops of the dam component elements. The keyway locking mechanisms may be interconnected via different methods; for example, the keyway locks may include a female and male component that may be interlocked. Additional elements may be employed to provide manual and/or automatic control for the dam employing control gates, gears, shafts, and other control devices currently known or hereinafter developed as applicable to a dam or dam component. Such elements are usually located on the upstream side of the dam; however, alternative embodiments of the present invention may have the dam components, elements, and precast structures arranged in various or adjustable configurations based on any number of external or internal factors, such as varying weather patterns at the dam location.

The example embodiment of FIG. 4 may include a unit 421 for lifting and lowering the control gears, which may be operably interconnected to a gear plate 427. The example embodiment of the controls may further include a shaft 424 employing interlocking techniques, such as using a keyway locking mechanism, optionally interconnected to guide roller 425 and/or a control gate support bracket 422 for enabling movement and control of the system. Alternative example embodiments may include features originally integrated into the precast structures or elements configured to be later applied or constructed to the precast structure(s).

Figure 5:
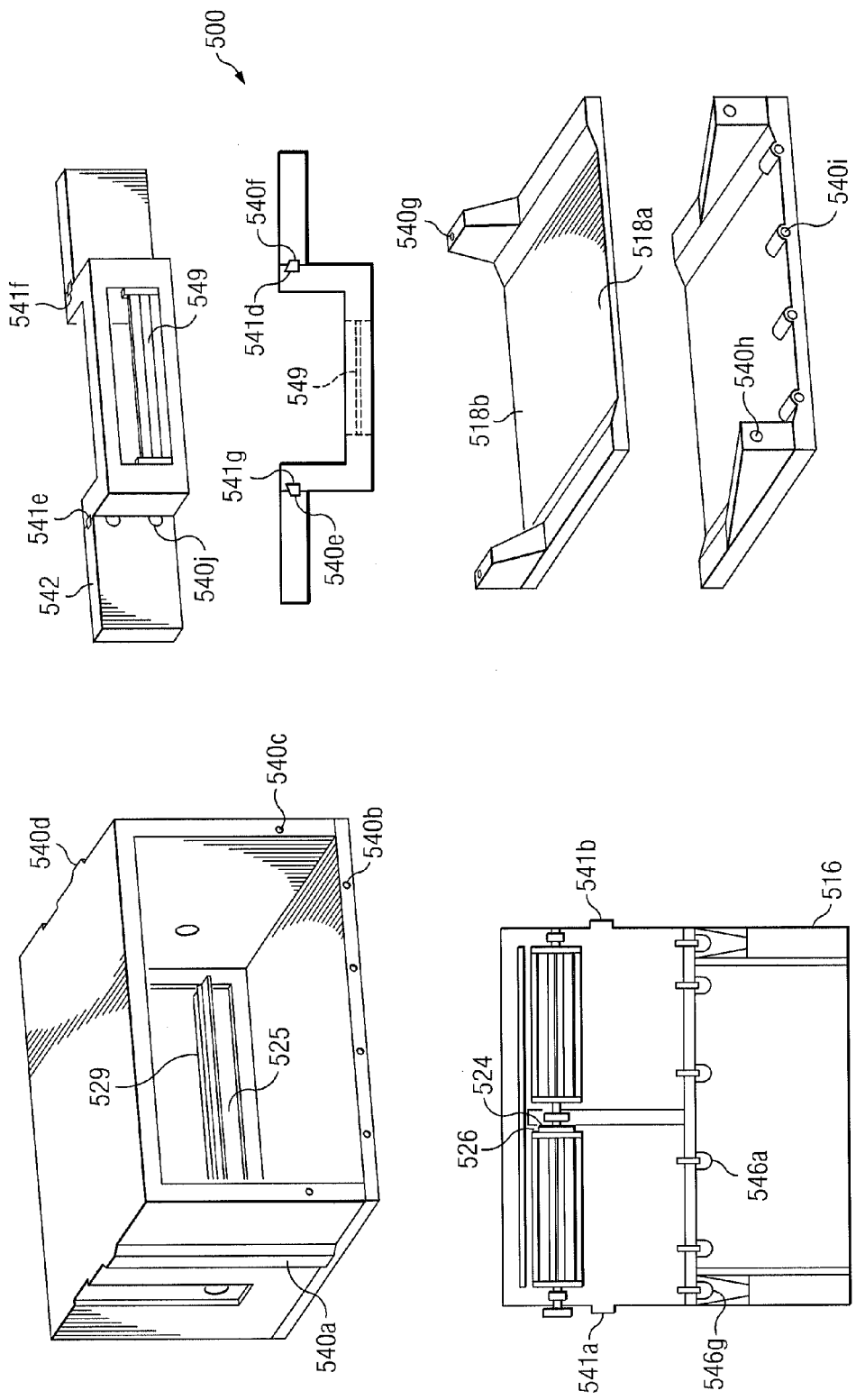
FIG. 5 is a group of mechanical diagrams illustrating alternative features and embodiments of the dam assembly according to embodiments of the present invention.

FIG. 5 is a group of mechanical diagrams 500 illustrating alternative features and embodiments of the dam assembly according to embodiments of the present invention. FIG. 5 includes multiple aspects of the precast segmental dam components, such as the turbine system, linkages between segments 540a-i, interconnecting features between segments 541a-g, adjustable wooden board gate system 549 or other material for water height or flow control, spillway 516 and spillway segments 518, linkage features between the spillway and segments 546, interconnecting linkages between cement or metal components of the segments and/or spillways, and example sizes of the precast structures. Further system components may include a water gate 529 to adjust water flow (for example, such as the water gate 529 being in an open position 525 thereby allowing water to flow through at different rates), and shaft and drive hole for interconnecting pinning elements on the top, sides, and bottom of the precast segments. It should be understood that the sizes of any of the dam components may vary such that they are suitable for the width, depth and flow rate of the waterway and provide ease of transportation, deployment, and interlocking assembly at the site of the dam.

Figure 6:
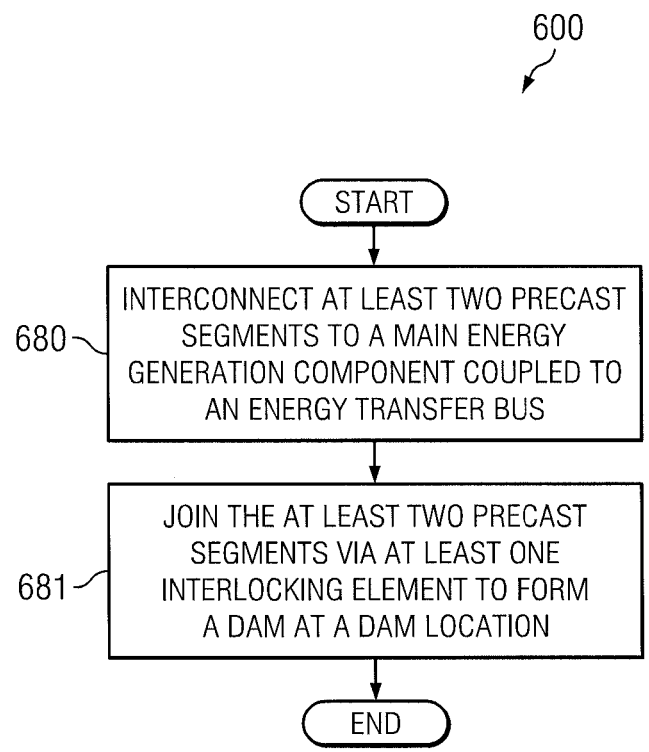
FIG. 6 is a flow diagram of an embodiment of the present invention that illustrates a method of dam assembly.

FIG. 6 is a flow chart 600 of an embodiment of the present invention that illustrates a method of dam assembly. The flow diagram 600 allows for a method of interconnecting at least two precast dam segments to a main energy generation component coupled to an energy transfer bus (680). The example method of flow diagram 600 further allows the joining of at least two precast segments via at least one interlocking element, such as a bolt or linkage system, or other such slot mechanism, to form a dam at a dam location (681).

Figure 7:
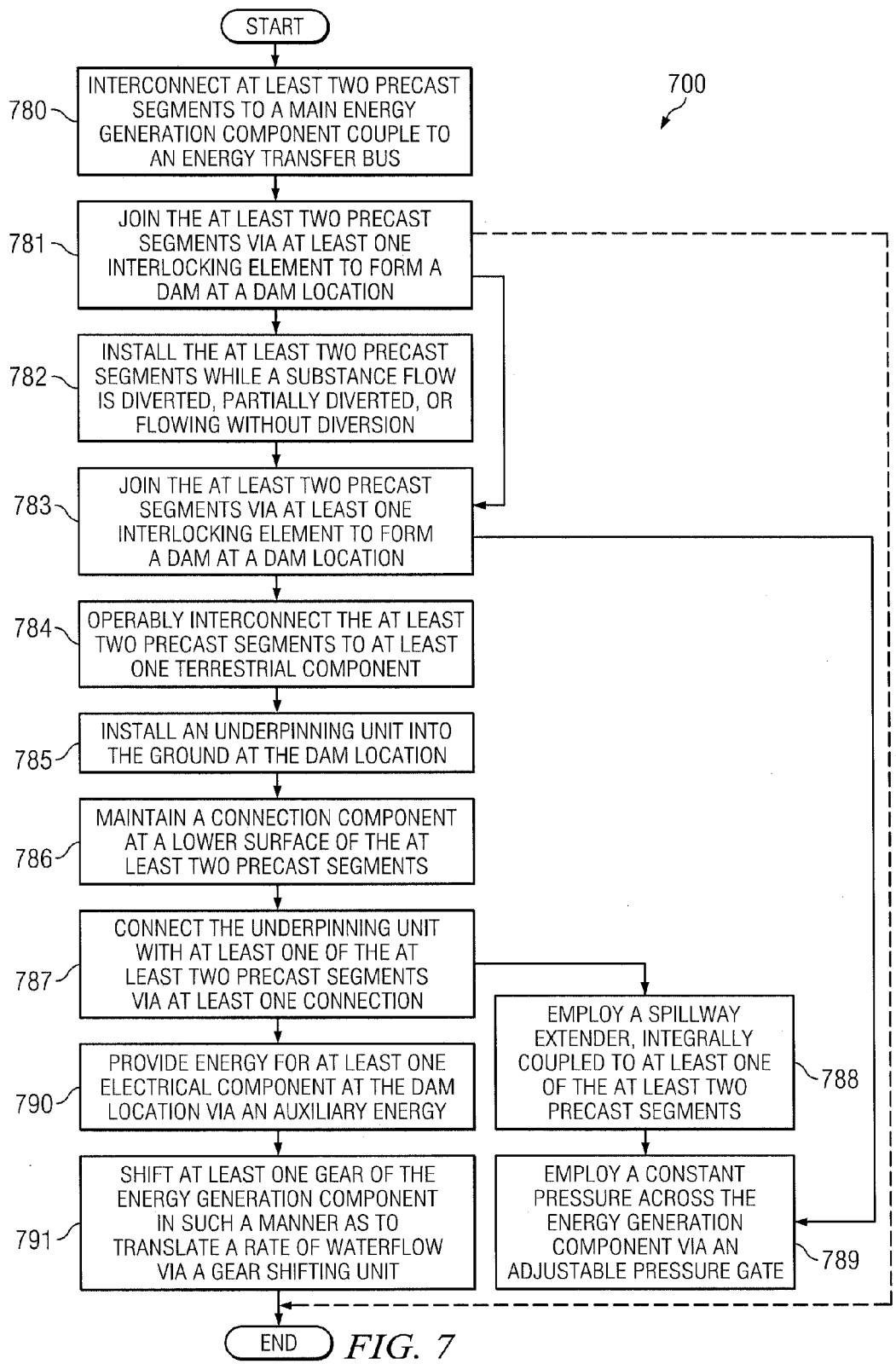
FIG. 7 is a flow diagram of an embodiment of the present invention that illustrates a method of assembling a dam of the present invention.

FIG. 7 is a flow diagram 700 of an embodiment of the present invention that illustrates components involved in assembling a dam of the present invention. After beginning, the method of flow diagram 700 enables interconnecting at least two precast segments to a main energy generation component coupled to an energy transfer bus (780) and joining the precast segments via at least one interlocking element to form a dam at a dam location (781). The method 700 may allow for installing at least two precast segments while a substance flow is diverted, partially diverted, or flowing without diversion (782) and joining the two precast segments via at least one interlocking element to form a dam at a dam location (783). The method 700 may further allow the precast segments to be operably interconnected to at least one terrestrial component (784) and installing an underpinning unit into the ground or base of a surface at the dam location (785). The method 700 may further be configured to enable the maintaining of a connection component at a lower surface of the precast segments (786). Further, the example method 700 may allow for connecting the underpinning unit with at least one of the precast segments via at least one connection element (787). The method 700 may further enable the employing of a spillway extender, integrally coupled to at least one of the at least two precast segments (788). The method may further provide for a constant pressure across the energy generation component via an adjustable pressure gate (789). Such an example method 700 may enable providing energy for at least one electrical component at the dam location via an auxiliary energy generation component (790) and further allow for shifting at least one gear of the energy generation component in such a manner as to translate a rate of waterflow via a gear shifting unit (791). It should be noted that the example method 700 may be performed in alternative manner using a similar or different order of operation as may be seen, for example, in FIG. 7.

Although not illustrated in detail in the figures, a structure that houses storage elements, such as batteries, may be constructed, optionally with precast elements, at the site of the dam or a short distance away, with energy generated by energy generating devices at or within the dam to be connected to the energy storage devices via electrical cables or other power transfer means.

Further, although not illustrated in the diagrams, any form of controller, such as general-purpose microprocessor, signal processor, hardware, software, or other elements that may be used to control electro-mechanical elements, may be employed to operate any of the electro-mechanical elements described herein.

Other example embodiments of the present invention may include a non-transitory computer readable medium containing instruction that may be executed by a processor, and, when executed, cause the processor to perform different functions, for example, to change the height of the gate used to control water height or flow, change the gear ratio of gears coupled to a water wheel or turbine, or even control any electrical elements associated with energy transfer to the energy storage elements or to the energy grid to which energy is or may be transferred. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that may support the example embodiments disclosed herein. The software may be stored in any form of computer readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

Further, any form of solar paneling may be employed, including solar trackers and any other auxiliary power systems may be employed to provide the energy, or backup of energy, for operating the electronics that may be associated with the dam, as disclosed herein.

While this invention has been particularly shown and described with references to example embodiments thereof, it will be understood by those skilled in the art that various changes in form and details may be made therein without departing from the scope of the invention encompassed by the appended claims.

What is claimed is:

1. A dam comprising:
    at least two precast segments configured to be interconnected;
    at least one interlocking element or structure configured to join the at least two precast segments to form the dam at a dam location;
    an underpinning unit configured to be installed into the ground at the dam location;
    a connection component at a lower surface of the at least two precast segments; and
    at least one connection element configured to mate with at least one respective connection component to connect the underpinning unit with the at least two precast segments.

2. The dam according to claim 1 further comprising a main energy generation component, operably interconnected to the at least two precast segments, the main energy generation component configured to be coupled to an energy transfer bus.

3. The dam according to claim 1 wherein the at least two precast segments are further configured to be installed either (i) while a substance flow is diverted or (ii) while a substance flow is not diverted.

4. The dam according to claim 1 wherein the at least two precast segments are further configured to be operably interconnected to at least one terrestrial component.

5. The dam according to claim 1 wherein the connection component is originally integrated into the lower surface of the at least two precast segments.

6. The dam according to claim 1 wherein the connection component is configured to be separately coupled to the lower surface of the at least two precast segments.

7. The dam according to claim 1 further comprising:
    a spillway extender, integrally coupled to at least one of the at least two precast segments, configured to prevent downstream erosion;
    an adjustable pressure gate, operably interconnected to at least one of the at least two precast segments, configured to maintain a constant pressure across an energy generation component; and
    a gear shifting unit configured to change at least one gear of the energy generation component in such a manner as to translate a rate of waterflow.

8. The dam of claim 7 wherein the gear shifting unit is self-operating.

9. The dam of claim 1 further comprising an auxiliary energy generation component configured to provide energy for at least one electrical component at the dam location.

10. A method of assembling a dam at a dam location, the method comprising:
providing at least two precast segments;
joining the at least two precast segments via at least one interlocking element to form a dam at a dam location;
installing an underpinning unit into the ground at the dam location;
maintaining a connection component at a lower surface of the at least two precast segments; and
connecting the underpinning unit with at least one of the at least two precast segments via at least one connection element configured to mate with at least one respective connection component.

11. The method of claim 10 further comprising operably interconnecting a main energy generation component to joined precast segments and an energy transfer bus.

12. The method of claim 10 further comprising installing the at least two precast segments while a substance flow is diverted, partially diverted, or flowing without diversion.

13. The method of claim 10 further comprising operably interconnecting the at least two precast segments to at least one terrestrial component.

14. The method according to claim 10 wherein the connection component is originally integrated into the lower surface of the at least two precast segments.

15. The method according to claim 10 wherein the connection component is configured to be separately coupled to the lower surface of the at least two precast segments.

16. The method according to claim 10 further comprising:
employing a spillway extender, integrally coupled to at least one of the at least two precast segments, to prevent downstream erosion;
maintaining a constant pressure across an energy generation component via an adjustable pressure gate, the adjustable pressure gate operably interconnected to a unit or other component of the dam; and
shifting at least one gear of the energy generation component in such a manner as to translate a rate of waterflow via a gear shifting unit.

17. The method of claim 16 wherein shifting the gear shifting unit is performed in a self-operating manner.

18. The method of claim 10 further comprising energizing at least one electrical component at the dam location via an auxiliary energy generation component.

19. A dam, comprising:
means for forming a structure of the dam;
means for interlocking said means for forming the structure of the dam;
underpinning means for providing stable contact with ground at the dam location; and
means for connecting the underpinning means with the means for forming the structure of the dam.

20. A dam, comprising:
means for forming a structure of a dam;
means for interlocking said means for forming the structure of the dam;
spillway extender means, integrally coupled to at least one segment of the means for forming the structure of the dam, configured to prevent downstream erosion;
means, operably interconnected to at least one segment of the means for forming the structure of the dam, for maintaining a constant pressure across an energy generation means; and
means for adjusting the energy generation means in a manner translating a rate of waterflow.

21. A dam comprising:
at least two precast segments configured to be interconnected;
at least one interlocking element or structure configured to join the at least two precast segments to form dam at a dam location;
a spillway extender, integrally coupled to at least one of the at least two precast segments, configured to prevent downstream erosion;
an adjustable pressure gate, operably interconnected to at least one of the at least two precast segments, configured to maintain a constant pressure across an energy generation component; and
a gear shifting unit configured to change at least one gear of the energy generation component in such a manner as to translate a rate of waterflow.

22. The dam of claim 21 wherein the gear shifting unit is self-operating.

23. The dam according to claim 21 further comprising:
an underpinning unit configured to be installed into the ground at the dam location;
a connection component at a lower surface of the at least two precast segments; and
at least one connection element configured to mate with at least one respective connection component to connect the underpinning unit with the at least two precast segments.

24. The dam according to claim 23 wherein the connection component is originally integrated into the lower surface of the at least two precast segments.

25. The dam according to claim 23 wherein the connection component is configured to be separately coupled to the lower surface of the at least two precast segments.

26. A method of assembling a dam at a dam location, the method comprising:
providing at least two precast segments;
joining the at least two precast segments via at least one interlocking element to form the dam at the dam location;
employing a spillway extender, integrally coupled to at least one of the at least two precast segments, to prevent downstream erosion;
maintaining a constant pressure across an energy generation component via an adjustable pressure gate, the adjustable pressure gate operably interconnected to a unit or other component of the dam; and
shifting at least one gear of the energy generation component in such a manner as to translate a rate of waterflow via a gear shifting unit.

27. The method of claim 26 wherein shifting the gear shifting unit is performed in a self-operating manner.

28. The method according to claim 26 further comprising:
installing an underpinning unit into the ground at the dam location;
maintaining a connection component at a lower surface of the at least two precast segments; and
connecting the underpinning unit with at least one of the at least two precast segments via at least one connection element configured to mate with at least one connection component.

29. The method according to claim 28 wherein the connection component is originally integrated into the lower surface of the at least two precast segments.

30. The method according to claim 28 wherein the connection component is configured to be separately coupled to the lower surface of the at least two precast segments.

* * * * *